(12) United States Patent
Martinetti et al.

(10) Patent No.: US 9,835,505 B2
(45) Date of Patent: Dec. 5, 2017

(54) ROLLING BEARING TEMPERATURE MEASUREMENT SYSTEM IN A RAILWAY AXLE-BOX AND ASSOCIATED METHOD

(71) Applicants: Maurizio Martinetti, Bruino (IT); Mario Rossi, Rivoli (IT); Silvano Sema, Cercenasco (IT); Fabrizio Sozzi, Sant' Antonino di Susa (IT)

(72) Inventors: Maurizio Martinetti, Bruino (IT); Mario Rossi, Rivoli (IT); Silvano Sema, Cercenasco (IT); Fabrizio Sozzi, Sant' Antonino di Susa (IT)

(73) Assignee: AKTIEBOLAGET SKF, Gothenburg (SE)

( * ) Notice: Subject to any disclaimer, the term of this patent is extended or adjusted under 35 U.S.C. 154(b) by 690 days.

(21) Appl. No.: 14/338,544

(22) Filed: Jul. 23, 2014

(65) Prior Publication Data
US 2015/0030052 A1    Jan. 29, 2015

(30) Foreign Application Priority Data

Jul. 23, 2013 (IT) .............................. TO2013A0625

(51) Int. Cl.
*G01K 7/04* (2006.01)
*G01K 13/08* (2006.01)
(Continued)

(52) U.S. Cl.
CPC .............. *G01K 13/08* (2013.01); *B29C 70/68* (2013.01); *B61K 9/04* (2013.01); *F16C 19/525* (2013.01);
(Continued)

(58) Field of Classification Search
CPC combination set(s) only.
See application file for complete search history.

(56) References Cited

U.S. PATENT DOCUMENTS 3,052,123 A * 9/1962 Gustafson ............. F16C 17/243
116/216
4,812,826 A * 3/1989 Kaufman ................. B61K 9/06
246/169 A
(Continued)

FOREIGN PATENT DOCUMENTS

EP    0571875 A1    12/1993
EP    1365163 A1    11/2003

*Primary Examiner* — Lisa Caputo
*Assistant Examiner* — Nasir U Ahmed
(74) *Attorney, Agent, or Firm* — Bryan Peckjian; SKF USA Inc. Patent Dept.

(57) ABSTRACT

A measurement system including: a radial external hole on a cover of a railway axle-box on the side of an edge of the cover facing towards a rolling bearing of the axle-box; a smaller axial hole made on the edge of the cover facing towards a ring of the bearing and opening in the radial hole; a cup-shaped body accommodated in the radial hole; a fork shaped spring integrally carried by a bottom wall of the cup-shaped body, projecting in front of the axial hole; a temperature probe slidingly accommodated within the axial hole and including a tubular element incorporating an electrical temperature sensor and an electric cable protruding from a first end of the tubular element accommodated within the cup-shaped body; and an abutting element removably coupled to the first end to cooperate with the spring, which pushes a second end of the probe out of the axial hole.

12 Claims, 5 Drawing Sheets

(51) Int. Cl.
    *B29C 70/68*     (2006.01)
    *G01K 1/14*     (2006.01)
    *B61K 9/04*     (2006.01)
    *F16C 41/00*     (2006.01)
    *F16C 19/52*     (2006.01)
    *B29L 31/34*     (2006.01)
    *F16C 19/38*     (2006.01)

(52) U.S. Cl.
    CPC .............. *F16C 41/007* (2013.01); *G01K 1/14* (2013.01); *B29L 2031/3481* (2013.01); *F16C 19/386* (2013.01); *F16C 2326/10* (2013.01); *Y10T 29/49117* (2015.01)

(56) References Cited

U.S. PATENT DOCUMENTS

| | | | | |
|---|---|---|---|---|
| 6,161,962 A | * | 12/2000 | French | B61F 15/20 384/448 |
| 2003/0006655 A1 | * | 1/2003 | Zhang | B61K 9/04 310/52 |
| 2003/0062765 A1 | * | 4/2003 | Melton | B60B 27/00 301/137 |

* cited by examiner

ROLLING BEARING TEMPERATURE MEASUREMENT SYSTEM IN A RAILWAY AXLE-BOX AND ASSOCIATED METHOD

CROSS-REFERENCE TO RELATED APPLICATIONS

This application claims priority to Italian Patent Application No. TO2013A000625 filed on Jul. 23, 2014.

TECHNICAL FIELD OF THE INVENTION

The present invention relates to a system or apparatus for measuring the temperature of a rolling bearing in a railway axle-box and to a method for obtaining such a system or apparatus, in particular applicable in a simple manner to railway axle-boxes not already preliminarily prepared to accommodate a temperature sensor.

BACKGROUND OF THE INVENTION

The current needs of railway technology impose having reliable systems for measuring the operating temperature of rolling bearings that equip railway axle-boxes.

As it is known, a railway axle-box is that component assembly that supports each end of a railway axle, which railway axle consists of an axle on which the wheels are shrunk on and which opposite ends are precisely carried in an idle manner by a pair of axle-boxes, which are restrained to the railway car by means of suitable suspensions. Each axle-box comprises an annular support, which accommodates the rolling bearing therein, and a closing cover. The rolling bearing receives one end of the axle on the inner ring and the cover closes the axle-box towards the outer sides of the railway car, thus covering and protecting the bearing and the end of the axle, which also normally carries a phonic wheel, which rotation speed is read by a specific sensor carried by the cover.

Since railway axle-boxes and the relevant covers may have the most disparate shapes, it is currently not possible to arrange a universal system, and therefore one which can be standardized, for reading the operating temperature of the axle-box bearing. It is also extremely difficult to retrofit existing railway axle-boxes with a temperature sensor for the same reason.

SUMMARY OF THE INVENTION

It is the object of the present invention to provide a system or apparatus for measuring the temperature of a rolling bearing in a railway axle-box that is easy and affordable to make, is reliable and can be standardized and therefore used universally. It is also an object of the invention to provide a method for obtaining such a system or apparatus, which is also simple to implement on existing railway axle-boxes, which are not already preliminarily prepared to receive a temperature sensor.

Therefore, based on the invention, a system or apparatus is provided for measuring the temperature of a rolling bearing in a railway axle-box, and also a method for obtaining such a system or apparatus, having the features stated in the appended claims.

BRIEF DESCRIPTION OF THE DRAWINGS

The present invention will now be described with reference to the accompanying drawings, which illustrate a non-limiting exemplary embodiment thereof, in which:

FIGS. 5 and 7 show the cross section view, of the main components in the measurement system of the invention.

DETAILED DESCRIPTION OF THE INVENTION

Figure 1:
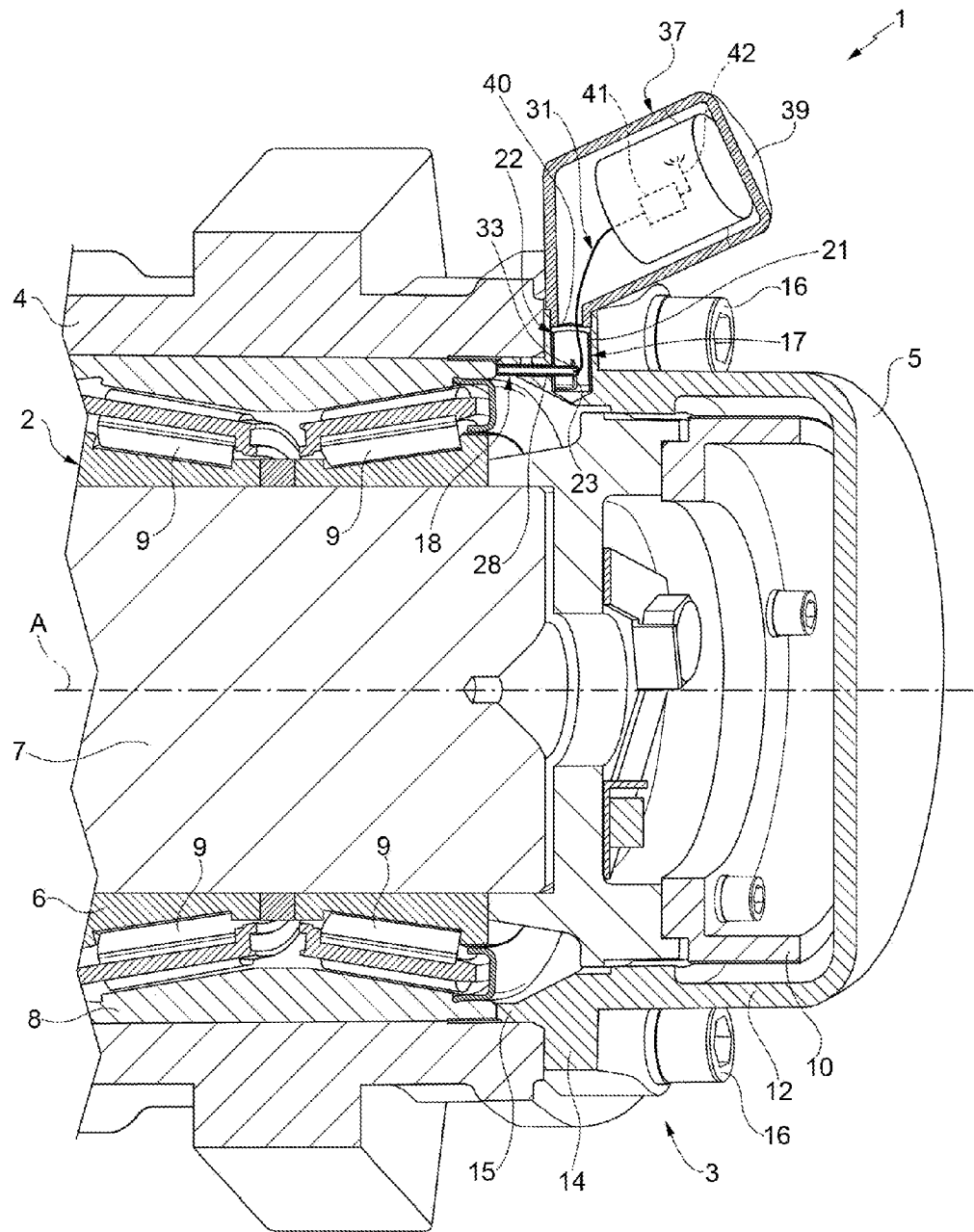
FIG. 1 diagrammatically shows a terminal end of a railway axle with a relevant support axle-box equipped with the system for measuring the temperature of the bearing inside the axle-box according to the invention.
Figure 2:
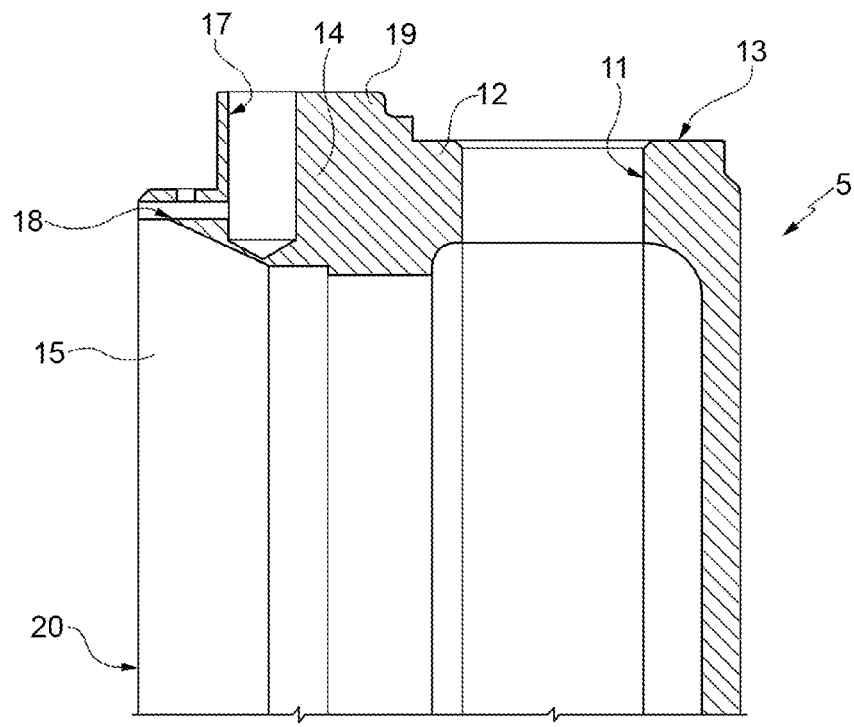
FIG. 2 diagrammatically shows an elevation view in radial section, on enlarged scale, of a cover of the railway axle-box in FIG. 1 with certain elements of the measurement system of the invention already placed on site.

With reference to FIGS. 1 to 4, numeral 1 indicates a system (the word "system" intended to mean "apparatus") as a whole for measuring the temperature of a rolling bearing 2 in a railway axle-box 3 of known type.

Axle-box 3, whatever its shape and sizes, comprises an annular support 4, which accommodates the rolling bearing 2 therein, and a closing cover 5. The rolling bearing 2 comprises an inner ring 6, which receives a terminal end of a railway axle 7, an outer ring 8 mounted angularly integral within the annular support 4, and a plurality of rolling bodies 9 interposed between the rings 6 and 8. Cover 5 closes the axle-box 3 towards the outer sides of the railway car (known and not illustrated for simplicity), thus covering and protecting bearing 2 and the end of axle 7, which also normally carries a phonic wheel 10 (which is known), which rotation speed about an axis A that is also the symmetry axis of bearing 2, of axle 7 and of axle-box 4, all coaxial to each other, is read by a specific sensor (known and not illustrated for simplicity) carried by cover 5 in a seat 11 (FIGS. 2 and 3) made radially through a generally cylindrical lateral wall 12 of cover 5.

Cover 5 is generally cup-shaped, in the example shown, seat 11 is made at a flattened portion 13 of the lateral wall 12 immediately adjacent to an annular edge 14 of cover 5 provided with an annular neck 15 with a smaller diameter than the outer diameter of edge 14. In use (FIGS. 1 and 4B), edge 14 goes in axial abutment against the annular support 4, against which cover 5 is blocked integrally by means of screws 16 (FIG. 1), while neck 15 goes in abutment against the outer ring 8 of bearing 2 thus axially blocking it inside the annular support 4.

According to the invention, the measurement system 1 comprises a first hole 17 made in radial direction with respect to the symmetry axis A of bearing 2, externally on the cover 5 of the railway axle-box 4, on the side of edge 14 which is facing in use towards the rolling bearing 2, and a second hole 18 having a smaller diameter than the one of hole 17 and made in axial direction (i.e. parallel to axis A) on edge 14 of cover 5, in the non-limiting example shown, through neck 15, so as to be in use facing ring 8 of bearing 2, which cooperates in abutment against edge 14 of cover 5 through neck 15.

In the non-limiting embodiment illustrated, hole 17 preferably consists of a blind radial hole made from the outside of cover 5, preferably but not necessarily angularly at, i.e. in correspondence with, seat 11, when this is provided. In any case, in the non-limiting embodiment illustrated, hole 17 is obtained in a peripherally outer portion 19 of the edge 14 of cover 5, preferably but not necessarily immediately adjacent to the flattened portion 13 and to the relevant seat 11 for the rotation speed sensor of bearing 2 and of the axle 7 thereof supported thereby. More generally, hole 17 may be obtained in any point of edge 14.

Hole 18 is a through hole which starts from an outer front flat surface 20 (FIGS. 2, 3) of edge 14, in the illustrated case in point, of neck 15, which is carried axially protruding from edge 14, and opens in hole 17, therein; hole 18 further preferably has a diameter which is about one order of magnitude less than the diameter of hole 17.

The measurement system 1 further comprises (FIGS. 3 and 4) a cup-shaped body 21 accommodated in hole 17, the term "cup-shaped" meaning here and throughout the entire description a concave body or element (such as e.g. cover 5) delimited by an annular lateral wall and by a bottom wall and open on the side opposite to the bottom wall.

The cup-shaped body 21 is accommodated in the radial hole 17 so as to leave free an end stretch 22 of hole 17, opposite to the axial hole 18, in the sense that stretch 22 is arranged on the opposite side of hole 18; the cup-shaped body 21 is preferably but not necessarily made of an electrically isolating synthetic moulded plastic material; it is in any case driven with interference into hole 17.

The measurement system 1 according to the invention further comprises, combined with the elements described hereto, a spring 23 integrally carried by the cup-shaped body 21 so as to be integral as one piece with the cup-shaped body 21; spring 23 is arranged in the cup-shaped body 21, so as to project in front of hole 18, which is in direct communication with the interior of the cup-shaped body 21.

Figure 5:
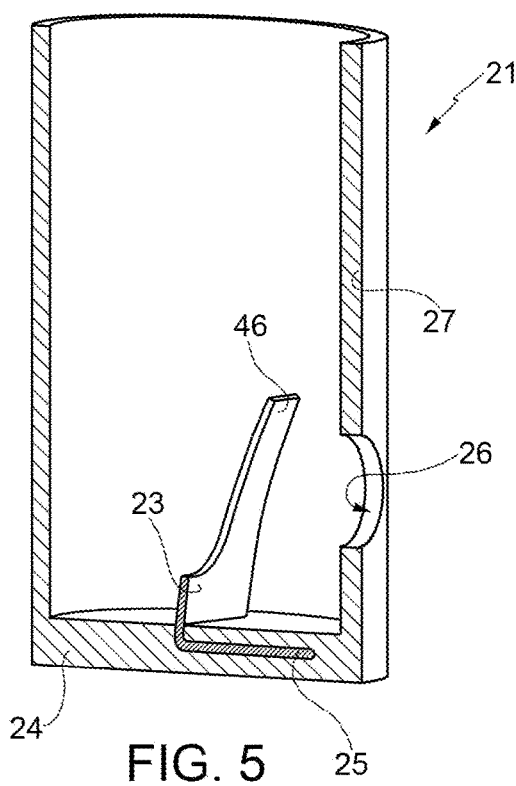
FIGS. 5, 6 and 7 show a perspective view on enlarged scale.
Figure 6:
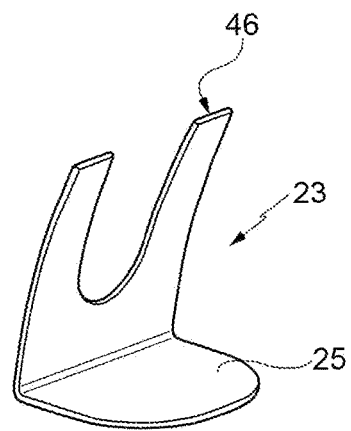

To this end, and also with reference to FIGS. 5 and 6, spring 23 is preferably a leaf spring made of harmonic steel and is integrally carried by a bottom wall 24 of the cup-shaped body 21, in which bottom wall 24 an L-bent end 25 of spring 23 is preferably buried, the cup-shaped body 21 being preferably made, as already indicated, of a synthetic moulded plastic material. If the cup-shaped body 21 were made in another manner or of another material or in any event it were not possible to embed end 25 into the thickness of the bottom wall 24, end 25 would be fixed integrally to the bottom wall 24 in any other suitable manner.

The leaf spring 23 (FIGS. 5 and 6) projects from the bottom wall 24 obliquely crosswise to the bottom wall 24, so as to progressively approach a through hole 26 made through a lateral wall 27 of the cup-shaped body 21 and arranged coaxial (FIGS. 4A and 4B) to hole 18, with respect to which, hole 26 has a diameter substantially identical or slightly greater.

A fork shaped free end 46 of the leaf spring 23 is arranged facing the through hole 26 and, accordingly, also hole 18.

Figure 7:
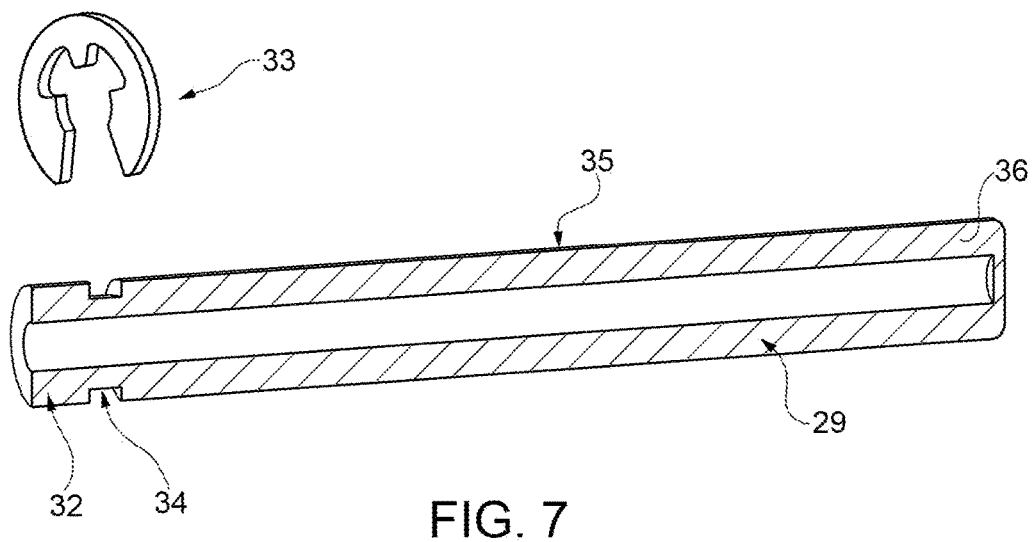

The measurement system 1 according to the invention comprises a temperature probe 28 accommodated, according to an important aspect of the invention, axially sliding within hole 18. Probe 28 in turn comprises a tubular element 29 (FIG. 7) longer than hole 18 and carrying therein an electrical temperature sensor 30, and an electrical connecting cable 31 protruding from a first axially open end 32 of the tubular element 29, which end 32 is normally overhangingly accommodated within the cup-shaped body 21.

Finally, the measurement system 1 according to the invention comprises a removable shoulder element 33, which is integrally but removably coupled to/on end 32, to cooperate in use in abutment against spring 23; in the example shown, the shoulder element consists of an elastic stop ring 33, preferably of the Benzing type, inserted snap-wise in an annular groove 34 made externally on a lateral wall 35 of the tubular element 29, on the side of the first end 32 thereof.

Figure 3:
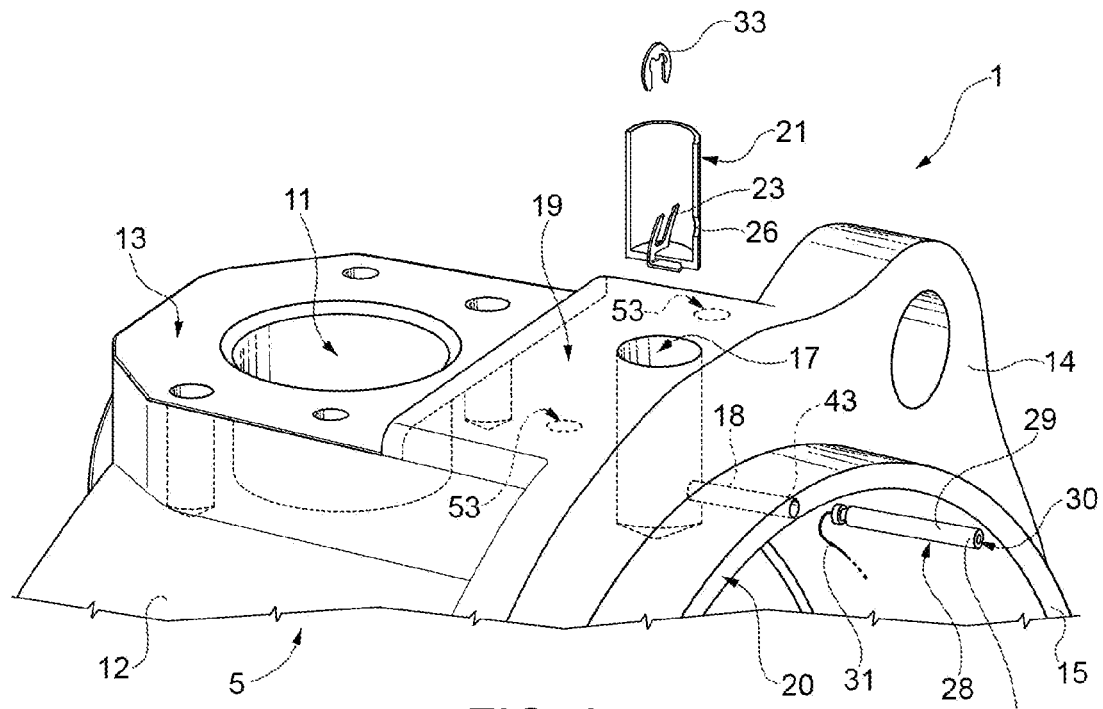
FIG. 3 shows an exploded perspective view of the cover in FIG. 2, and of the main components in the measurement system of the invention.
Figure 4A:
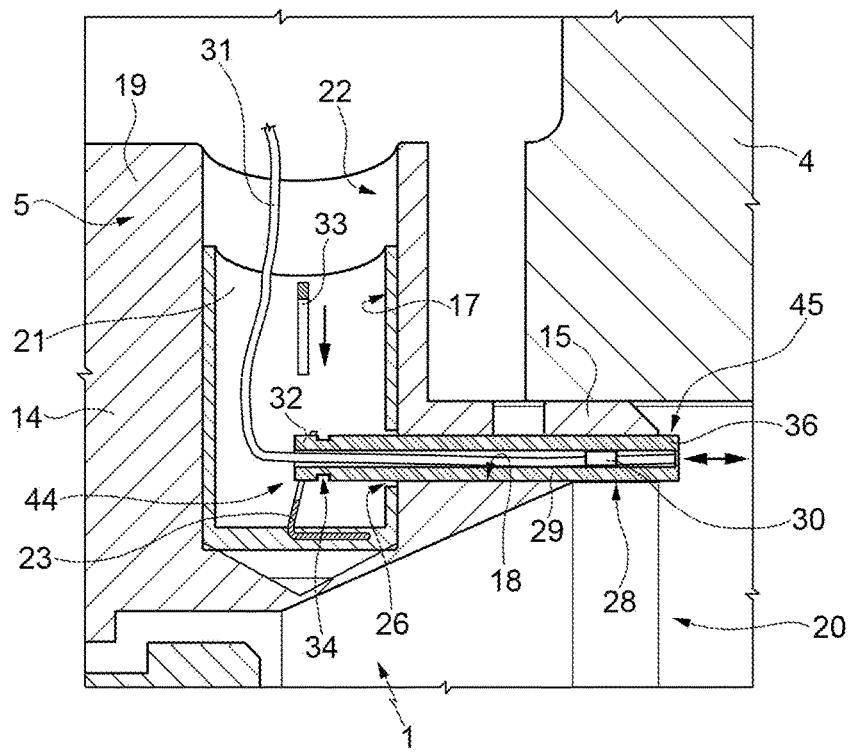
FIGS. 4A and 4B show the operation of the measurement system of the invention.

Furthermore, the cup-shaped body 21 is driven with interference into hole 17 so as to align the holes 18 and 26, and the diameter of hole 17, as well as the complete diameter of the lateral wall 27, which is cylindrical, of the cup-shaped body 21, are selected so as to be adapted to allow in use (as shown in FIGS. 3 and 4A) the introduction and snap-wise mounting of the elastic stop ring 33 in the cup-shaped body 21 with probe 28 already slidingly inserted in hole 18 and up to inside the cup-shaped body 21.

According to the invention, the length of hole 18 and of the tubular element 29, the shape of spring 23 and the coupling position of the shoulder element 33 with the tubular element 29 are selected so that spring 23 normally pushes probe 28 towards an extracted position (shown in FIG. 4A), in which a second end 36 of the tubular element 29 axially projects out of the axial hole 18, so that when cover 5 is arranged with edge 14 in abutment against ring 8 of bearing 2 (FIG. 4B), spring 23 is preloaded and presses end 36 of the tubular element 29 and of probe 28 against the outer ring 8 of bearing 2 with predetermined force and such as to ensure an optimal reading of the temperature of bearing 2 by sensor 30.

The electrical temperature sensor 30 preferably consists of a suitable thermocouple, which was buried/incorporated, for example by plastic deformation, such as drawing, into the tubular element 29, which is preferably made of a good electrical and heat conductor metallic material, e.g. copper.

The measurement system 1 further preferably also comprises a wireless transmitting head 37 (FIG. 1) driven into the end stretch 22 of hole 17.

Figure 4B:
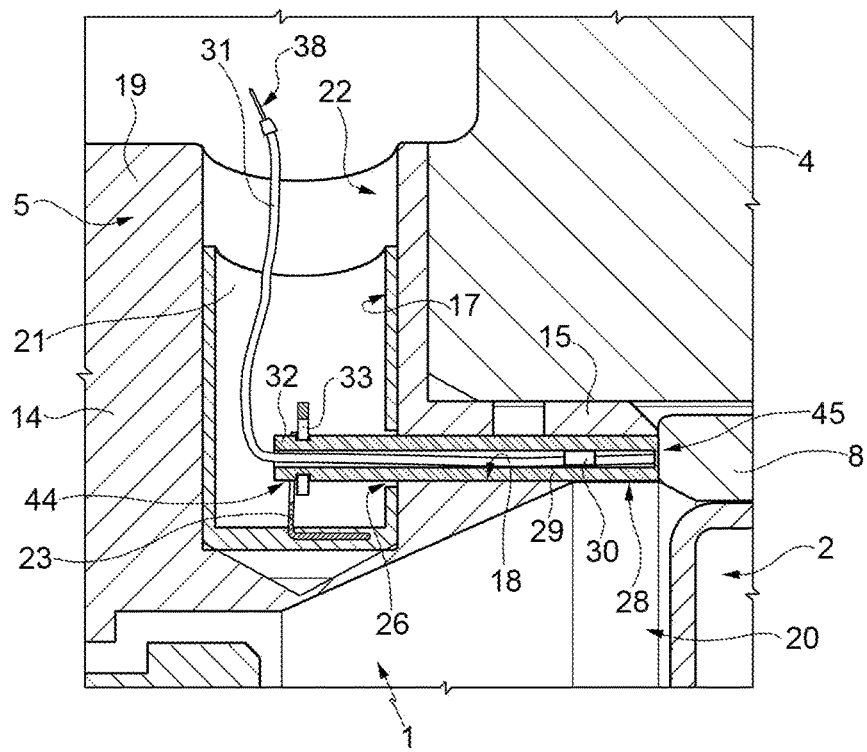

The electric cable 31 protruding from end 32 of the tubular element 29 overhangingly accommodated within the cup-shaped body 21 connects with the transmitting head 37, for example by means of a pin 38 (FIG. 4B).

According to the non-limiting embodiment in FIG. 1, the wireless transmitting head 37 comprises: a casing defined by a protective box-like and pipe-shaped element 39, made of a synthetic plastic material, ending with a cylindrical sleeve 40 inserted slightly forced into stretch 22 of hole 17; an analog-digital converter 41 connected to the electric cable 31; and a transmitting aerial 42. Converter 41 and aerial 42 are fluid-tightly accommodated in element 39 and may thus transmit the conveniently processed electric signal generated by sensor 30, to wireless reception means (of known type and not illustrated for simplicity).

Figure 9:
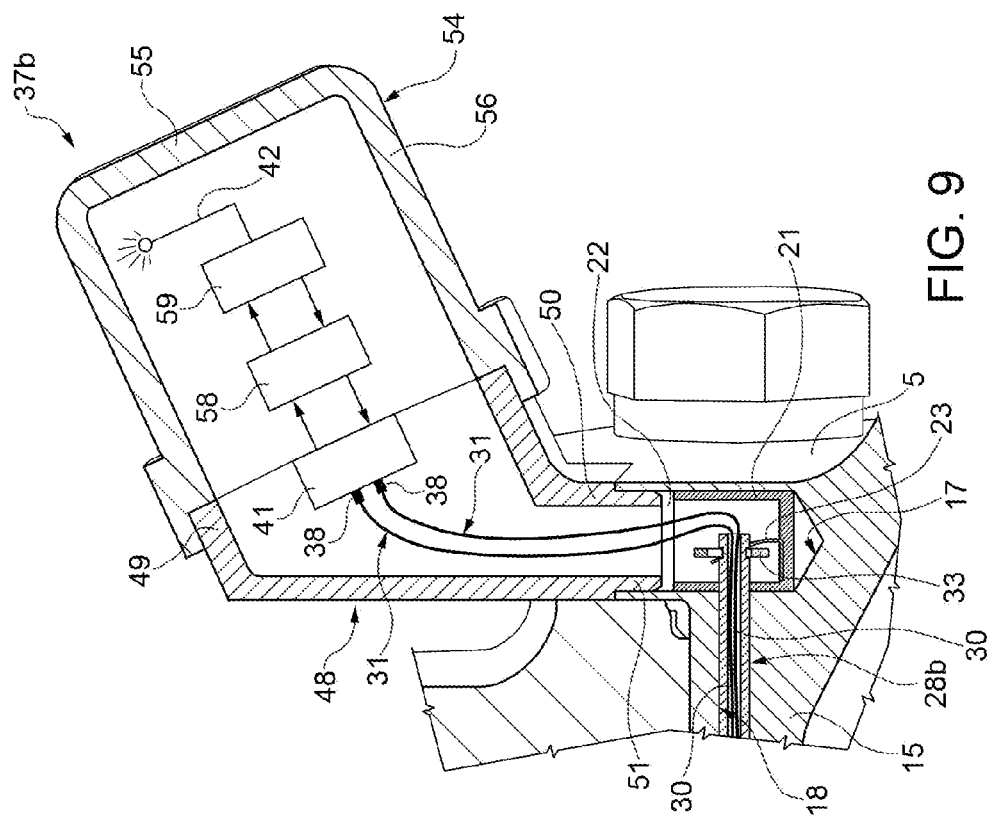
FIGS. 8 and 9 show a three-quarter perspective view, on enlarged scale, from the bottom and in section, of a preferred embodiment of a detail of the system for measuring the temperature of the inner bearing of the axle-box in FIG. 1.
Figure 8:
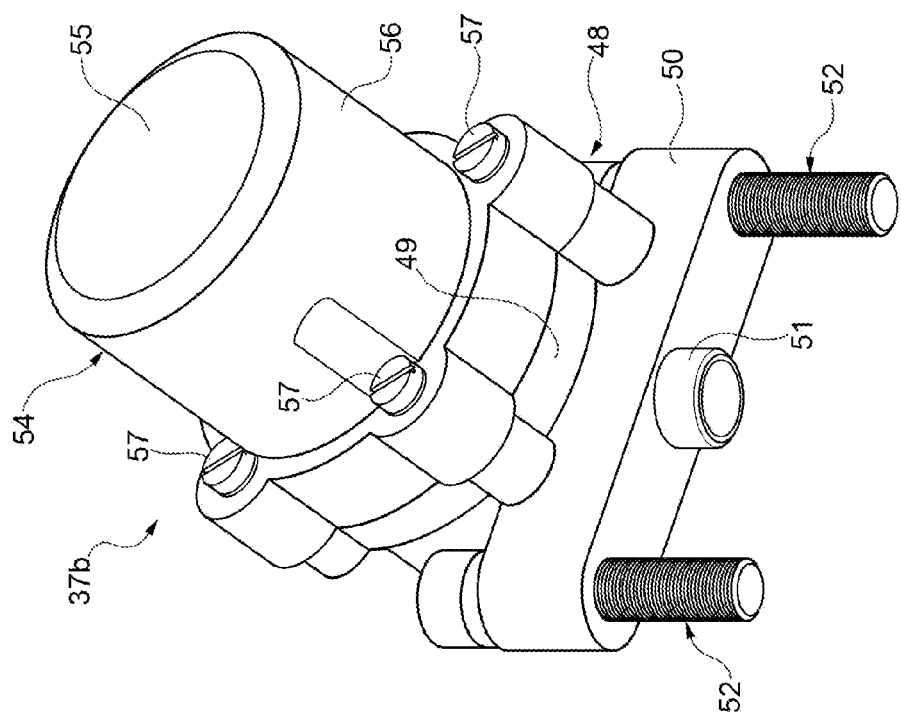

FIGS. 8 and 9 show a different and preferred embodiment of the wireless transmitting head, indicated as a whole with numeral 37b; details similar or equal to those described above are indicated with the same numerals for simplicity.

According to one aspect of the invention, head 37b is formed by several elements and to start with, comprises a first casing element defined by an internally hollow, pipe-shaped and box-like element 48, which however unlike the box-like element 39, has a cylindrical open end 49, and a pedestal 50 opposite to end 49 and facing in use towards hole 17, which is arranged transverse to end 49 and is equipped with a sleeve 51, similar to sleeve 40, which overhangingly projects from pedestal 50 so as to couple in use with hole 17, within stretch 22 left free by the cup-shaped body 21.

Pedestal 50 carries a pair of fixing screws 52 to cover 5 and is adapted to rest on the peripherally outer portion 19 of the annular edge 14 of cover 5, which is provided with suitable threaded holes 53 (illustrated with a broken line in FIG. 1) adapted to receive the screws 52.

Head 37b further comprises a second cup-shaped casing element 54, that is delimited by a flat bottom wall 55 and by a lateral wall 56 which in this example is cylindrical; the casing element 54 is integrally and fluid-tightly fixed to the casing element 48 by means of screws 57, at the open end 49 and closing the open end 49, so that the casing elements 48 and 54 replace, in head 37b, the protective box-like element 39 in a single piece of the wireless head 37.

Inside the casing defined by the casing elements 48 and 54 coupled to each other, the wireless head 37b comprises an analog-digital converter 41, a microcontroller (microprocessor) 58 and a micro transmitter 59 equipped with an aerial 42; microprocessor 58 is inserted between the analog-digital converter 41 and transmitter 59. All these electronic components may be easily accommodated in the casing element 54 alone, or in both the elements 48 and 54.

Finally, according to the embodiment shown in FIG. 9, the temperature probe 28 is replaced by a temperature probe 28b identical to probe 28, except in that it has two electrical temperature sensors 30 accommodated buried in the tubular element 29, rather than one alone; the two sensors 30 are both connected, by means of electric cables 31 and pins 38, to the analog-digital converter 41, so as to have a signal redundancy which allows any failures to be overcome of one of the sensors 30 and which possibly allows microprocessor 58 to compare the temperature readings.

Based on the description, it is apparent that the present invention also relates to a method for making a system for measuring the temperature of a rolling bearing 2 in a railway axle-box 3, such as the measurement system 1 described above, comprising the steps described below.

Firstly, a first hole 17 is made externally on a cover 5 of the railway axle-box 3, with cover 5 removed from the axle-box 3, on the side of an edge 14 of cover 5 facing in use towards the rolling bearing 2; this first hole is made in radial direction with respect to a symmetry axis (A) of bearing 2.

A second hole 18 is then made on edge 14 of cover 5, with cover removed from the axle-box 3, the diameter of the second hole 18 being significantly smaller (less than half and slightly more than one tenth) than the one of hole 17; the second hole 18 is made in axial direction with respect to the symmetry axis A of bearing 2, i.e. parallel to axis A of bearing 2, so as to be in use facing towards an outer ring 8 of bearing 2 cooperating in use in abutment against edge 14 of cover 5; in the embodiment illustrated, hole 18 is made in the front of neck 15, through the front surface 20; hole 18 is also made so as to extend up to being at hole 17, perpendicular thereto, and accordingly to transversely open in hole 17.

In the meantime, a cup-shaped body 21 is made preferably but not necessarily by moulding a synthetic plastic material, the cup-shaped body 21 being delimited by a bottom wall 24 and by a lateral wall 27 perpendicular to the bottom wall 24 and provided with a through hole 26, preferably, when it is made by moulding a synthetic plastic material, by co-moulding into the cup-shaped body 21 a leaf spring 23 which projects into the cup-shaped body 21 in front of the through hole 26. Alternatively, for example in the case of a metal cup-shaped body 21, spring 23 is integrally fixed to the bottom wall 24 in any suitable manner, by soldering, gluing, etc.

Successively, still with cover 5 removed from the axle-box 3, the cup-shaped body 21 is driven with interference into the first hole 17, coaxial to hole 17 (FIG. 3), with the through hole 26 coaxially aligned to the second hole 18 of cover 5; thereby, hole 18 is put in direct communication with the interior of the cup-shaped body 21, with a free end 46 of the leaf spring 23 arranged facing hole 18.

Still with cover 5 removed from the axle-box 3, a temperature probe 28 (or 28b) is mounted axially sliding in hole 18 by inserting it through an end 43 (FIG. 3) of hole 18 opposite to hole 17, that is facing the opposite side of hole 17, so as to make a first end 44 of probe 28/28b, provided with the electrical connecting cable(s) 31 and corresponding to end 32 of the tubular element 29, to overhangingly insert into the cup-shaped body 21; furthermore, a second end 45 of probe 28/28b, opposite to end 44 and corresponding to end 36 of the tubular element 29, is left to project from edge 14 of cover 5, out of hole 18 (FIG. 4A).

Then, still with cover 5 removed, and passing through hole 17, a shoulder element consisting of the elastic stop ring 33 is coupled within the cup-shaped body 21 on the first end 44 of probe 28, so as to be made integral with probe 28; the shoulder element 33 used is adapted to cooperate with the leaf spring 23, once snap-wise coupled in the annular groove 34 of the tubular element 29, to elastically deform spring 23 when the second end 45 of probe 28 is pushed in a fully retracted position inside hole 18 (FIG. 4B).

Finally, cover 5 is mounted to close the axle-box 3, so that edge 14 (in the example, neck 15 of edge 14) abuts against the outer ring 8 of bearing 2, thus pushing probe 28 in the retracted position. Obviously, spring 23 thus exerts an elastic reaction which pushes end 45 of probe 28 with predetermined pressure against bearing 2 (against the outer ring 8 of bearing 2) thus allowing probe 28 to take a precise and optimal reading of the internal temperature of bearing 2. Probe 28 emits in use an electric signal which is collected by the electric cable 31.

The method according to the invention further comprises the steps of:
  assembling a wireless transmitting head 37/37b comprising an analog/digital converter 41 and an aerial 42 enclosed in a box-like element 39, i.e. in a casing formed by the two elements 48 and 54; and
  connecting the wireless transmitting head 37/37b to the temperature probe 28/28b through the electrical transmission cable(s) 31 and fixing the wireless transmitting head 37/27b to cover 5.

In the case of the wireless head 37, such fixing is executed simply by driving the wireless transmitting head 37, already assembled and cabled, into an end stretch 22 of hole 17, opposite to hole 18, and left free by the cup-shaped body 21, so as to integrally fix the wireless transmitting head 37 to cover 5.

In the case of the wireless head 37b, this is instead assembled, fixed and cabled in succession, one element at a time: first the casing element 48 alone is mounted and fixed on cover 5, by causing the cables 31 with the pins 38 of probe 28b projecting from end 49; then, the casing element 54 is mounted and fixed on the casing element 48, preferably with the electronic components 41, 58, 59 and 42 already assembled therein, then, in this step, connecting the cables 31 (for example by means of pins 38) to the analog-digital converter 41.

The advantages associated with the present invention are apparent. A reliable system is obtained for measuring the temperature of bearing 2 due to the pressure exercised by spring 23 on "head" 45 of probe 28/28b and to the possible signal redundancy ensured by probe 28b. All components in the system are standardized and may be used for the systems 1 intended for any type of railway axle-box. Any type of railway axle-box may be quickly and easily equipped with the measurement system of the invention, even if not originally planned to mount a temperature sensor, and thus operating according to the method of the invention, by simply making the two holes 17 and 18 in a suitable position on cover 5 removed from the axle-box 3 and then using the components described.

The invention claimed is:

1. A system for measuring temperature of a rolling bearing in a railway axle-box; the system comprising:
   the railway axle-box;
   the rolling bearing;
   a first hole made in radial direction with respect to a symmetry axis (A) of the rolling bearing externally on a cover of the railway axle-box on a side of an edge of the cover facing towards the rolling bearing;
   a second hole having smaller diameter than the first hole and made in axial direction with respect to the symmetry axis (A) of the rolling bearing on the edge of the cover facing towards a ring of the rolling bearing cooperating in abutment against the edge of the cover, the second hole opening in the first hole;
   a cup-shaped body accommodated in the first hole;
   a spring integrally carried by the cup-shaped body that projects in front of the second hole, which is in direct communication with the interior of the cup-shaped body;
   a temperature probe slidingly accommodated within the second hole and in turn comprising a tubular element longer than the second hole and carrying therein at least one electrical temperature sensor provided with an electrical connecting cable protruding from a first end of the tubular element, the first end overhangly accommodated within the cup-shaped body; and
   a shoulder element integrally coupled to the first end for cooperating with the spring;
   wherein the length of the second hole and of the tubular element, the shape of the spring and a coupling position of the shoulder element with the tubular element are selected so that the spring pushes the probe towards an extracted position in which a second end of the tubular element axially protrudes out of the second hole, and wherein
   when the cover is arranged with the edge in abutment against the ring of the rolling bearing, the spring is preloaded and presses the second end of the tubular element of the probe against the ring of the rolling bearing.

2. The measurement system according to claim 1, wherein the cup-shaped body is accommodated in a first radial hole to leave an end portion of the first radial hole, opposite to a second axial hole; the measurement system further comprises a wireless transmitting head coupled at least in part with the end portion of the first radial hole; at least one electric cable protruding from the first end of the tubular element overhangly accommodated within the cup-shaped body connecting with the transmitting head.

3. The measurement system according to claim 1, wherein the first hole is a blind radial hole made in a peripherally outer portion of the edge of the axle-box cover, preferably but not necessarily immediately adjacent a seat for a bearing rotation speed sensor.

4. The measurement system according to claim 1, wherein the spring is a leaf spring and is integrally carried by a bottom wall of the cup-shaped body, in which bottom wall an L-bent end of the spring is preferably buried, the cup-shaped body being preferably made of a synthetic molded plastic material.

5. The measurement system according to claim 4, wherein the leaf spring projects from the bottom wall obliquely transversely to the bottom wall, to progressively approach a through hole made through a lateral wall of the cup-shaped body and arranged coaxial to the second hole, with respect to which the through hole has a diameter substantially identical or slightly greater; a fork shaped free end of the leaf spring is arranged facing the through hole.

6. The measurement system according to claim 1, wherein the shoulder element consists of an elastic stop ring, preferably of the Benzing type, inserted snap-wise in an annular groove made externally on a lateral wall of the tubular element, on the side of the first end thereof.

7. The measurement system according to claim 6, wherein the cup-shaped body is driven with interference into the first hole; the diameter of the first hole being adapted to allow the introduction and snap-wise mounting of the elastic stop ring into the cup-shaped body with the probe already slidingly inserted into the second hole and up to inside the cup-shaped body.

8. The measurement system according to claim 1, wherein the diameter of the second hole is about one order of magnitude less than the diameter of the first hole; the at least one electrical temperature sensor consisting of a thermocouple buried in the tubular element.

9. The measurement system according to claim 1, wherein the temperature probe comprises two electrical temperature sensors buried in the same tubular element and each provided with a respective electric cable.

10. The measurement system according to claim 1, wherein the measurement system comprises a wireless transmitting head that comprises:
    a first casing element defined by an internally hollow, pipe-shaped and box-like element, having one open end and a pedestal opposite to the open end and facing toward the first hole, the pedestal provided with a sleeve which overhangingly projects from the pedestal to couple with the first hole, within an end stretch of the first hole left free by the cup-shaped body; and
    a second casing element which is cup-shaped and integrally and fluid tight joined to the first casing element in correspondence with the open end and closing the open end;
    a pedestal bearing at least a pair of fixing screws to the cover.

11. A method for making a system for measuring temperature of a rolling bearing in a railway axle-box, comprising:
    making a first hole externally on a cover of the railway axle-box, with the cover removed from the railway axle-box, on a side of an edge of the cover facing towards the rolling bearing, the first hole being made in radial direction with respect to a symmetry axis (A) of the rolling bearing;
    making on the cover edge, with cover removed from the railway axle-box, a second hole having smaller diameter than the first hole, the second hole being made in axial direction with respect to the symmetry axis (A) of the rolling bearing to be in use facing towards an outer ring of the rolling bearing cooperating in use in abutment against the cover edge, and so that the second hole opens into the first hole;

making, by molding a synthetic plastic material, a cup-shaped body delimited by a bottom wall and by a lateral wall perpendicular to the bottom wall and provided with a through hole, preferably co-molding into the cup-shaped body a leaf spring which projects into the cup-shaped body in front of the through hole;

driving with interference the cup-shaped body in the first hole, with the through hole aligned and coaxial with the second hole, which is thus put in direct communication with the inside of the cup-shaped body, with a free end of the leaf spring arranged facing the second hole; with cover removed from the railway axle-box, mounting a temperature probe axially sliding in the second hole inserting it through an end of the second hole opposite to the first hole, to make a first end of the probe, provided with at least one electrical connecting cable overhangly insert into the cup-shaped body and leaving a second end of the probe, opposite to the first one, projecting from the edge of the railway axle-box cover out of the second hole; with the cover removed from the railway axle-box, passing through the first hole, coupling a shoulder element integrally on the first end of the probe, the shoulder element being adapted to cooperate with the leaf spring for elastically deforming it when the second end of the probe is pushed in a fully retracted position into the second hole; and mounting the cover closing the railway axle-box, so that the cover edge abuts against the outer ring of the rolling bearing pushing the probe in the retracted position.

12. A method according to claim 11, further comprising:

assembling a wireless transmitting head having an analog-digital converter and an aerial enclosed in a casing;

connecting the wireless transmitting head to the temperature probe through the at least one electrical transmission cable;

coupling the wireless transmitting head in an end portion of the first hole, opposite to the second hole, left free by the cup-shaped body; and fixing the wireless transmitting head to the cover.

* * * * *